United States Patent
Traupman

(10) Patent No.: US 12,536,560 B2
(45) Date of Patent: *Jan. 27, 2026

(54) ADAPTABLE IMPLEMENTATION OF ONLINE VIDEO ADVERTISING

(71) Applicant: ADAP. TV, INC., Dulles, VA (US)

(72) Inventor: Jonathan David Traupman, Berkeley, CA (US)

(73) Assignee: ADAP.TV, INC., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/990,753

(22) Filed: Dec. 20, 2024

(65) Prior Publication Data

US 2025/0124466 A1 Apr. 17, 2025

Related U.S. Application Data

(63) Continuation of application No. 16/736,007, filed on Jan. 7, 2020, now Pat. No. 12,205,136, which is a continuation of application No. 12/430,827, filed on Apr. 27, 2009, now Pat. No. 10,572,894.

(51) Int. Cl.
  *G06Q 30/02* (2023.01)
  *G06Q 30/0241* (2023.01)
(52) U.S. Cl.
  CPC ................. *G06Q 30/0241* (2013.01)
(58) Field of Classification Search
  CPC .................................................. G06Q 30/0241
  See application file for complete search history.

(56) References Cited

U.S. PATENT DOCUMENTS

| | | |
|---|---|---|
| 2003/0023488 A1 | 1/2003 | Landsman et al. |
| 2004/0148571 A1 | 7/2004 | Lue |
| 2004/0201610 A1 | 10/2004 | Rosen et al. |
| 2005/0033641 A1 | 2/2005 | Jha et al. |
| 2005/0108095 A1 | 5/2005 | Perlmutter |
| 2005/0188400 A1 | 8/2005 | Topel |
| 2007/0157228 A1* | 7/2007 | Bayer .............. H04N 21/26208 348/E7.071 |
| 2009/0013347 A1 | 1/2009 | Ahanger et al. |
| 2009/0062681 A1 | 3/2009 | Pradeep et al. |
| 2011/0231265 A1 | 9/2011 | Brown et al. |

OTHER PUBLICATIONS

J. Krikke, "Streaming video transforms the media industry," in IEEE Computer Graphics and Applications, vol. 24, No. 4, pp. 6-12, Jul.-Aug. 2004, doi: 10.1109/MCG.2004.17. (Year: 2004).*

* cited by examiner

*Primary Examiner* — Waseem Ashraf
*Assistant Examiner* — Christopher C Busch
(74) *Attorney, Agent, or Firm* — Bookoff McAndrews, PLLC

(57) ABSTRACT

An ad player presents ads in association with a video player by evaluating an associated ad script. The ad player transforms data included in the ad script into operational instructions. Hence, the ad player flexibly and dynamically configures itself and presents ads in accordance with the contents of the ad script, enabling a publisher to modify advertising aspects simply by modifying the ad script. The ad script can comprise a script in a tag-based markup language that is readable by the ad player. For example, the ad script can include one or more tags, each tag including one or more attributes that are each set to a value. The ad player determines the values of the attributes and presents ads in accordance with associated ad characteristics or behaviors.

20 Claims, 6 Drawing Sheets

ADAPTABLE IMPLEMENTATION OF ONLINE VIDEO ADVERTISING

CROSS-REFERENCE TO RELATED APPLICATIONS

This application is a continuation of and claims the benefit of priority to pending U.S. application Ser. No. 16/736,007, filed Jan. 7, 2020, which application is a continuation of and claims the benefit of priority to pending U.S. application Ser. No. 12/430,827, filed Apr. 27, 2009, now U.S. Pat. No. 10,572,894, which are incorporated herein by references in their entireties.

BACKGROUND

1. Field of Art

The disclosure generally relates to the field of online advertising. More specifically, the disclosure relates to displaying advertisements in association with a video player using a dynamic and re-configurable ad player

2. Description of the Related Art

For publishers of a webpage that presents online video, advertising is often critical to monetizing the webpage. A conventional approach to including advertisements in a webpage is to design the webpage to include one or more hardwired on-screen locations designated for the display of advertisements (ads). When video or other multimedia content is presented by the webpage, a conventional ad player, either designed by the webpage publisher or provided by a third party, can be included in the webpage and configured to present ads in the hardwired locations. Prior to delivery of the webpage to a client device, the ad player is programmed to present one or more ads of a pre-determined type according to a pre-determined sequence at pre-determined times (e.g., points within the playback of a video on the webpage).

Under the conventional approach, modifying the advertising characteristics of the webpage (e.g., changing the on-screen location, timing, type, or sequence of ads presented in the webpage) is inconvenient. For example, at least the webpage or the ad player must be significantly redesigned to implement any desired changes to the advertising characteristics of the webpage, placing a burden on the publisher of the webpage and potentially on the third party responsible for the ad player. Furthermore, the webpage publisher's options for modifying advertising characteristics of the webpage can be restricted. For example, if the webpage utilizes an ad player provided by a third party, the ad player may only support the presentation of ads of certain types, at certain on-screen locations, at certain times, or in certain sequences. The third party may be unwilling to modify the ad player as desired by the publisher.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
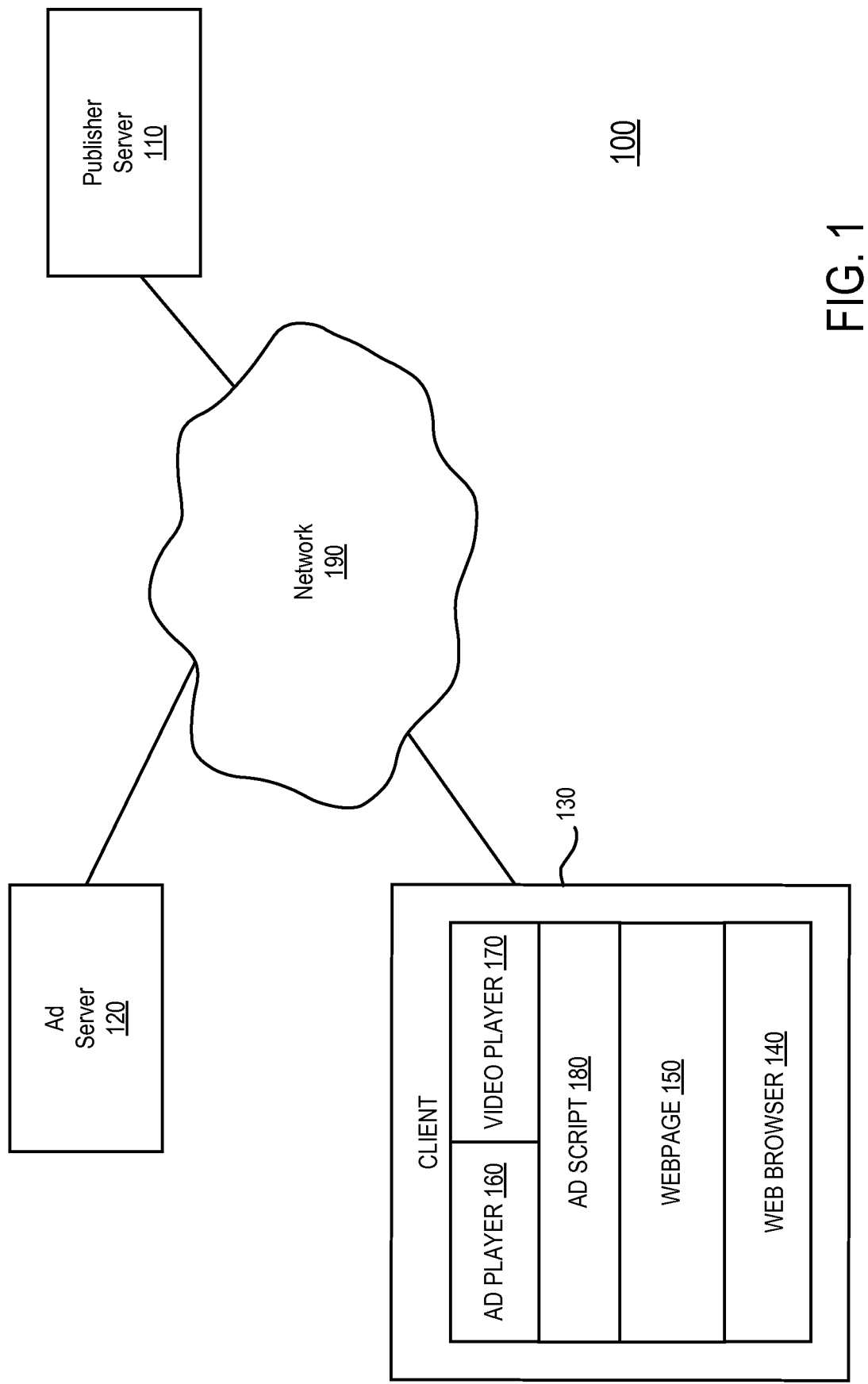
FIG. 1 is a high-level block diagram illustrating a system for dynamically configuring online advertising according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

General Overview

Systems and methods are disclosed for displaying an advertisement in an ad player that is associated with a video player. The ad player interprets an ad script and transforms data included in the ad script into operational instructions. In one embodiment, the ad player can evaluate the ad script and transform the data therein after loading a webpage that includes the video player. In an alternate embodiment, the ad player can evaluate the ad script and transform the data therein in conjunction with video player functionality with a network connection and/or network application programming interface (API), but without needing a webpage or web browser. Hence, the ad player flexibly and dynamically configures itself and presents ads in accordance with the contents of the ad script, enabling a publisher to modify advertising aspects simply by modifying the ad script. The ad script can comprise a script in a tag-based markup language that is readable by the ad player. For example, the ad script can include one or more tags, each tag including one or more attributes that are each set to a value. The ad player determines the values of the attributes and presents ads in accordance with associated ad characteristics or behaviors.

In one embodiment, the ad player evaluates an ad script that comprises data corresponding to operational specifications for the ad player. The ad player determines a spatial boundary and a temporal boundary from space data (e.g., data included in a <space> tag element) included in the ad script and creates an ad space within the ad player based on the determined spatial boundary and the determined temporal boundary. The ad player identifies an ad for display in the created ad space from ad data (e.g., data included in an <ad> tag element) included in the ad script.

The ad player then retrieves the identified ad from an ad server for display in the created ad space along with processing logic for rendering the identified ad in the created ad space. Then the ad player presents for display the identified ad within the created ad space. The ad player can additionally modify the ad script to reflect successful presentation of the identified ad. In one embodiment, the ad player performs the above-described or additional actions in response to triggering events. The triggering events are defined by trigger data (e.g., data included in a <trigger> tag element) and correspond to events within the ad player or video player).

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

Architectural Overview

FIG. 1 is a high-level block diagram of a computing environment 100 for dynamically configuring online advertising according to one embodiment. The computing environment 100 includes a publisher server 110, an ad server 120, and a client 130 communicatively coupled by a network 190. In one embodiment, the publisher server 110 and the ad server 120 are conventional web servers. The client 130 is a computer or other electronic device used by one or more users to perform activities including browsing webpages on the network 190. The client 130, for example, can be a personal computer, personal digital assistant (PDA), or a mobile telephone. Only one publisher server 110, one ad server 120, and one client 130 are shown in FIG. 1 in order to simplify and clarify the description. Other embodiments of the computing environment 100 can include any number of publisher servers 110, ad servers 120, and/or clients 130 connected to the network 190.

The network 190 represents the communication pathways between (e.g., communicatively couples) the publisher server 110, ad server 120, and client 130. In one embodiment, the network 190 is the Internet. The network 190 can also include dedicated or private communications links that are not necessarily part of the Internet. In one embodiment, the network 190 uses standard communications technologies and/or protocols. Thus, the network 190 can include links using technologies such as Ethernet, 802.11, integrated services digital network (ISDN), digital subscriber line (DSL), asynchronous transfer mode (ATM), etc. Similarly, the networking protocols used on the network 190 can include the transmission control protocol/Internet protocol (TCP/IP), the hypertext transport protocol (HTTP), the simple mail transfer protocol (SMTP), the file transfer protocol (FTP), etc. The data exchanged over the network 190 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), secure HTTP (HTTPS), and/or virtual private networks (VPNs). In another embodiment, the entities can use custom and/or dedicated data communications technologies instead of, or in addition to, the ones described above.

As shown in FIG. 1, the client 130 executes a web browser 140 that allows a user to retrieve and view content from webpages and other computers on the network 190. The web browser 140 also allows the user to submit information to webpages and other computers on the network 190. In one embodiment, the web browser 140 is a conventional web browser, such as MICROSOFT INTERNET EXPLORER or MOZILLA FIREFOX. The web browser 140 supports technologies including JavaScript, ActionScript, and other scripting languages that allow the client 130 to perform actions in response to scripts and other data sent to the web browser 140 via the network 190. In some embodiments, functions ascribed herein to the web browser 140 are implemented via plug-ins such as ADOBE FLASH.

The publisher server 110 delivers a webpage 150 to the web browser 140 over the network 190. The web browser 140 then loads the webpage 150 and presents it to the user. The webpage 150 includes a video player 170 for presenting online videos and an ad player 160 for presenting online advertisements (ads) to the user. The video player 170 can be any conventional video player suitable for online video such as WINDOWS MEDIA PLAYER, REALPLAYER, QUICKTIME, WINAMP, or any number of custom video players built to run on a suitable platform such as the Adobe Flash platform.

The ad player 160 can comprise JavaScript and/or ActionScript code executable by the web browser 140 that is delivered to the client 130 in addition to or as part of the webpage 150. The ad player 160 transforms the contents of the ad script 180 into operational instructions that govern behavior of the ad player 160. The web browser 140 can execute the ad player 160 directly (e.g., as JavaScript) or via a browser plug-in module (e.g., as a Flash plug-in). The ad player 160 communicates with the ad server 120 over the network 190 to request and receive ads for presentation on the client 130. An ad can comprise any computer-executable code (e.g., JavaScript, ActionScript, Flash, or HTML) whose execution results in the presentation of text, images, and/or sounds to the user. For example, an ad can be a linear ad (i.e., an ad that interrupts the presentation of an online video) or a non-linear ad (i.e., an ad that is presented concurrently with the online video) presented either before, during, or after the online video. An ad can also be a text ad, a graphic ad (sometimes referred to as a banner ad), or a video ad. An ad can be presented as overlaying the online video or in any other position within the webpage 150. An ad can also be interactive and, in one embodiment, an ad can transition from one of the aforementioned varieties of ads to a different variety or trigger an additional ad in response to an action by the user.

In one embodiment, the ad player 160 also requests and receives processing logic (e.g., additional JavaScript or ActionScript code) from the ad server 120 for rendering the ads. Such processing logic is referred to herein as an ad rendering module. As detailed below in reference to FIG. 3A, in one embodiment, the ad player 100 exists as an overlay of the webpage 150 and/or video player 170, capable of being wholly or partially invisible to the user. In this way, the webpage 150 and the video player 170 may be wholly or partially visible to the user, despite the overlay of the ad player 160. In order to present an ad to the user, a portion of the ad player 160 becomes wholly or partially visible.

In some embodiments, the video player 170 is designed, created, distributed, or controlled by some entity separate from that which designs, creates, distributes, or controls the ad player 160. It is understood, however, that the principles described herein can apply to configurations in which the same entity is responsible for the ad player 160 and the video player 170 and/or configurations in which the ad player 160 and video player 170 are integrated. Similarly, the videos shown by the video player 170 may be created or distributed by a publisher not responsible for the design or implementation of either the website 150, video player 170, or the ad player 160 (e.g., user-generated videos). The ads shown within the ad player 100 may also be created or distributed by an advertiser not responsible for the design or implementation of either the webpage 150, the video player 170 or the ad player 160 (e.g., a third party ad network).

In some embodiments, the video player 110 plays videos of an arbitrary format and the ad player 100 may display advertisements of a different arbitrary format. Example arbitrary video formats may comprise MJPEG, MPEG-1, MPEG-2, MPEG-4, RealVideo, Flash video (FLV) or any other video format suitable for distribution of video over the network 190. Example arbitrary ad formats may comprise videos of the aforementioned video formats, banner advertisements, textual advertisements, or any other ad format suitable for distribution of advertisements over the network 190. In some embodiments, the ads shown within the ad player 160 are interactive with a user and may influence the operation of the video player 170 based on actions of the user.

The ad player 160 executes an ad script 180 associated with and corresponding to the webpage 150. The ad script 180 can be included in source code of the webpage 150 or delivered separately to the client 130 by the publisher server 110, the ad server 120, or a third party server (not shown). In embodiments in which the associated ad script 180 is delivered separately from the webpage 150, the ad script can be delivered either before, simultaneously, or after the webpage 150. Hence, rather than being designed prior to delivery of the webpage 150 to the client 130 to operate in a certain predetermined manner (e.g., display certain predetermined types of ads in certain predetermined locations), the ad player 160 operates flexibly and dynamically by, at run-time, transforming data included in the ad script 180 into operational instructions. For example, contents of the ad script 180 can specify which ads are presented by the ad player 160. Contents of the ad script 180 can further specify types, on-screen locations, durations, start times, stop times, triggering events, contextual requirements, and other characteristics of ads presented by the ad player 160.

As described above, the ad script 180 corresponding to and associated with the webpage 150 can be delivered separately from the webpage 150 by the publisher server 110, the ad server 120, or a third party server (not shown). Alternatively, the ad script 180 can be included in and delivered as part of the webpage 150. In one embodiment, the ad script 180 comprises processor-executable instructions formatted in accordance with a scripting language compatible with the ad player 160. In one embodiment, the scripting language of the ad script 180 is a tag-based markup language. A tag element of the ad script can comprise multiple attributes whose values modify meaning of the tag element. Further structural and operational details of the ad script 180 and its interaction with the ad player 160 and video player 170 are provided below in reference to FIG. 3.

The ability of the ad player 160 to dynamically and flexibly adapt its operation after loading of the webpage 150 as specified by contents of the ad script 180 has many benefits. For example, the publisher of the webpage 150 does not need to redesign the webpage 150 or consult with the owner of the ad server 120 to alter the advertising content of the webpage. Rather, which ads are displayed and how they are displayed by the ad player 160 can be modified in a dynamic and flexible manner simply by altering the ad script 180. Hence, the publisher of the webpage 150 can modify operation of the ad player 160 via the publisher server 110 and need not access the ad server 120. Furthermore, local execution of the ad script 180 by the client 130 offloads a significant processing burden from the ad server 120, beneficially reducing design and performance requirements for the ad server 120. Additionally, local execution of the ad script 180 by the client 130 also improves performance of the ad player 160 from the user's perspective as communications over the network 190 and associated delays are reduced.

It should be noted that the computing environment 100 illustrated in FIG. 1 is merely one example of the many varieties of systems in which the principles disclosed herein can be embodied. In some embodiments, the video player 170 and/or the ad player 160 operate as a stand-alone hardware element or set of computer-executable instructions (e.g., software or firmware). In such embodiments, a web browser 140 is not necessarily included in the client 130 and the ad player 160, video player 170, and ad script 180 are not necessarily associated with a webpage 150. Furthermore, the video player 170 and/or the ad player 160 can be included in any computing device having access to a network 190 and can receive the ad script 180 from any remote location such as a publisher server 110, ad server 120, or third party server.

For example, the video player 170 can be executed by a set-top box (e.g., one provided by a cable or satellite television provider) and the set-top box can retrieve the ad player 160 or the ad script 180 from a remote location, for example, in response to user input such as a request for an on-demand video. As another example, the client 130 can execute an operating system configured to access resources via a network 190, e.g., a Web operating system (or WebOS) or an operating system integrated with a network such as the world wide web and using JAVASCRIPT, cascading style sheets, and/or HTML 5. Hence, the client 130 can retrieve the ad player, 160, video player 170, and/or ad script 180 via the network 190 without utilizing a web browser 140 or retrieving a webpage 150.

Figure 2:
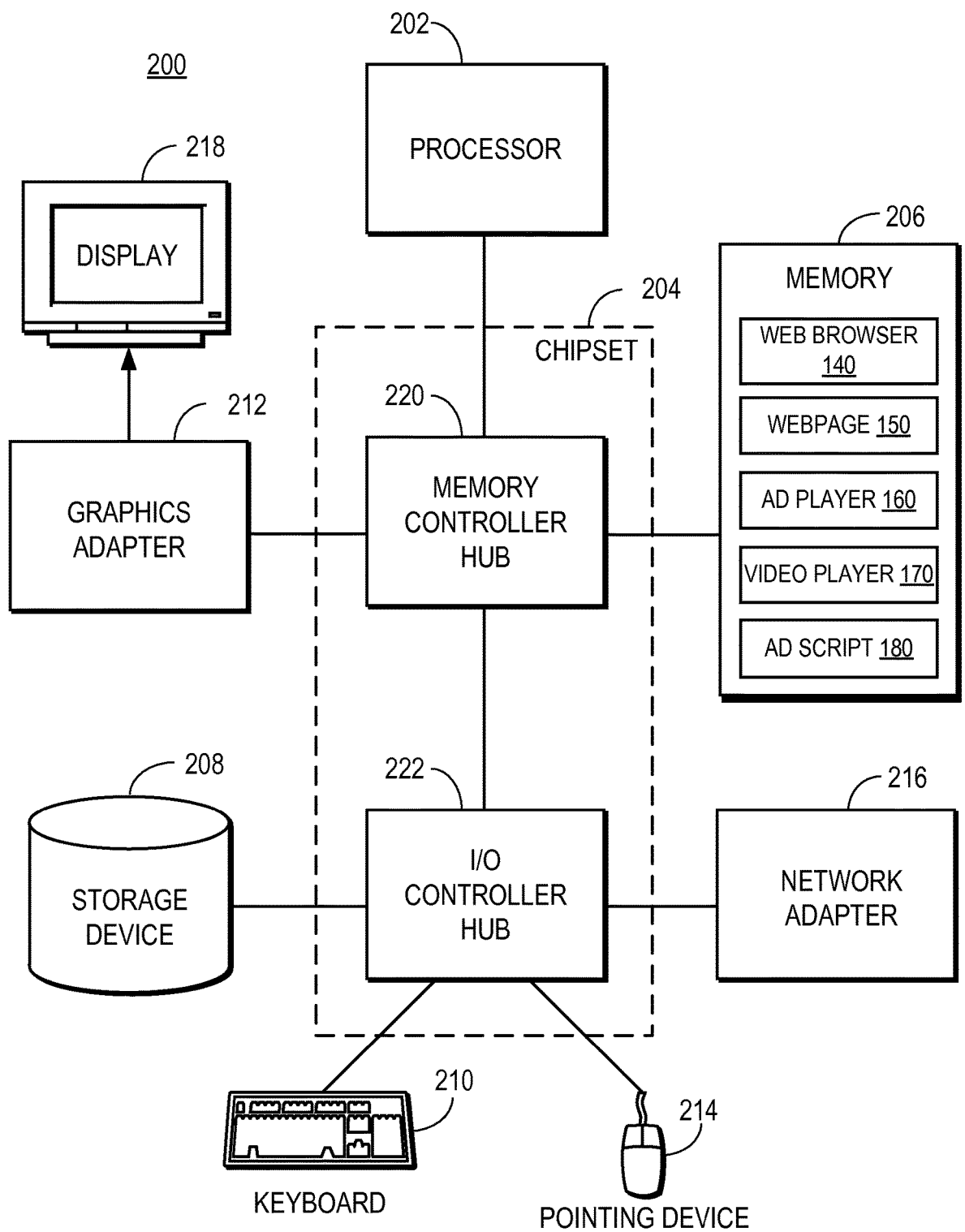
FIG. 2 is a high-level block diagram illustrating an example of a computer for use as a server and/or as a client according to one embodiment.

FIG. 2 is a high-level block diagram illustrating on example of a computer 200 for use as a client 130 and/or as a web server such as a publisher server 110 or an ad server 120. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The computer 200 is adapted to execute computer program modules for providing the functionality described herein. As used herein, the term "module" refers to computer program logic configured and used to provide the specified functionality. Thus, a module can be implemented in hardware, firmware, and/or software. In one embodiment, program modules are stored on the storage device 208, loaded into the memory 206, and executed by the processor 202. The storage device 208 is a computer-readable storage medium such as a hard drive, compact disk read-only memory (CD-ROM), DVD, or a solid-state memory device. The memory 206 is also a computer-readable storage medium and stores computer-executable instructions and data used by the processor 202.

In one embodiment, the memory 206 stores computer-executable instructions that cause the processor 202 to implement a method for displaying ads. The computer-executable instructions stored by the memory comprise instructions for the web browser 140. In one embodiment, after delivery of the webpage 150 and ad script 180 to the client 130 by the publisher server 110, the computer-executable instructions stored by the memory 206 further comprise instructions for the webpage 150, the ad player 160, the video player 170, and the ad script 180 as shown in FIG. 2.

The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to the network 190. Some embodiments of the computer 200 have different and/or other components than those shown in FIG. 2.

The types of computers 200 used by the entities of FIG. 1 can vary depending upon the embodiment and the processing power required by the entity. For example, a client 130 that is a mobile telephone typically has limited processing power, a small display 218, and might lack a pointing device 214. A server providing an ad server 120, in contrast, might comprise multiple servers working together to provide the functionality described herein. Also, a server typically lacks hardware such as the graphics adapter 212, the display 218, and user input devices.

Ad Player Operation

Figure 3A:
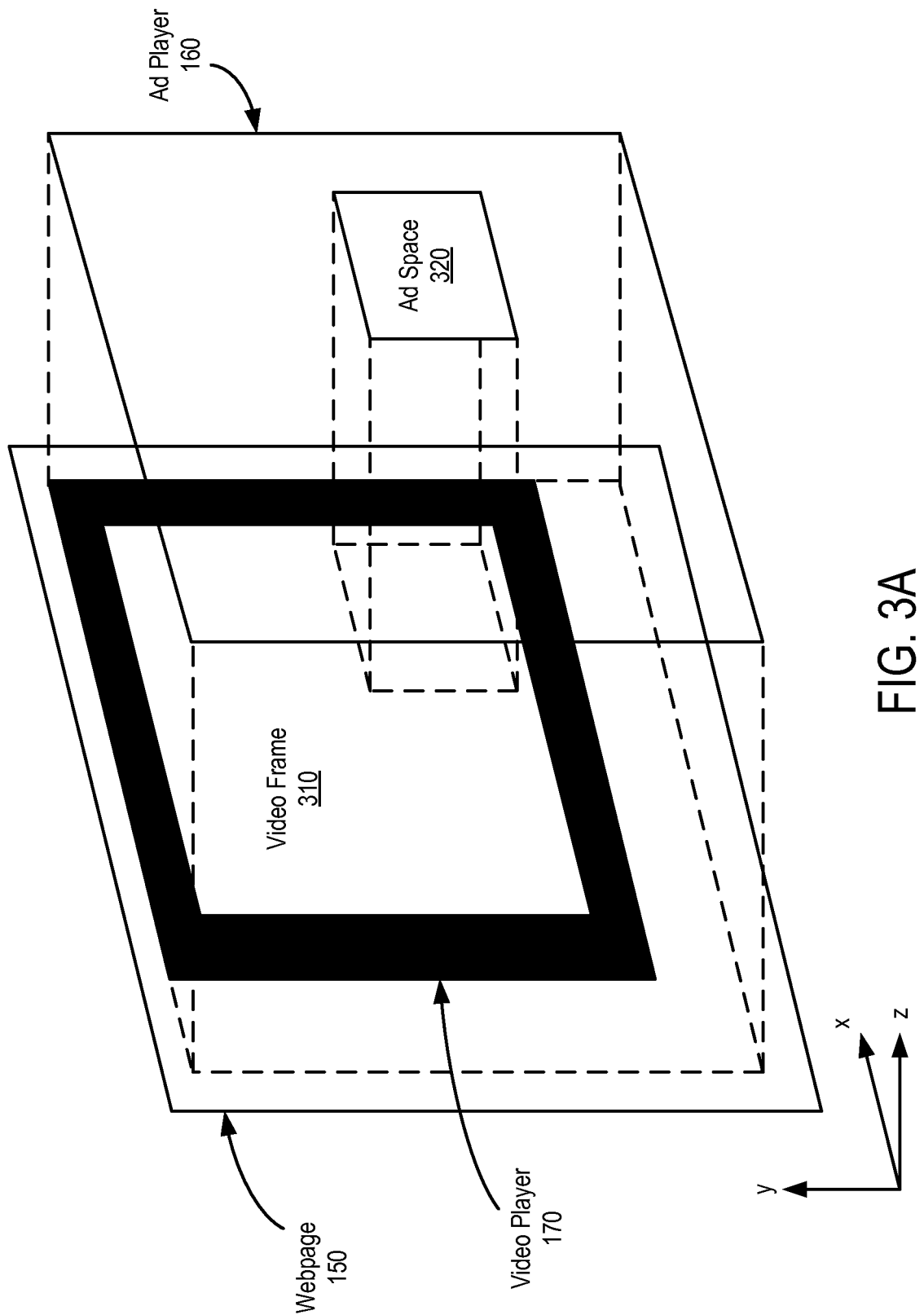
FIG. 3A is an exploded view of a configuration for displaying advertisements for online video according to one embodiment.

The diagram of FIG. 3A illustrates an exploded view of a configuration for the webpage 150, video player 170, and ad player 160 according to one embodiment. For the sake of illustrative clarity, FIG. 3A includes an indication of an x-direction, a y-direction, and a z-direction as part of an orthogonal coordinate system. From the vantage point of a user viewing the display 218, the y-direction is vertical in the plane of the surface of the display 218 with a positive y-direction corresponding to an upward direction, the x-direction is horizontal in the plane of the surface of the display 218 with a positive x-direction corresponding to a rightward direction, and the z-direction is horizontal and orthogonal to the surface of the display 218 with a positive z-direction corresponding to an outward direction towards the user. Although some elements of FIG. 3A are illustrated as separated in the z-direction, it is understood that this is merely for visual and explanatory clarity and that all elements of FIG. 3A can be presented to the user in the surface plane of the display 218.

The webpage 150 includes the video player 170, and within the video player 170, there exists a video frame 310 in which video is presented. The ad player 160 exists as an overlay of the webpage 150 and can appear wholly or partially invisible on the display 218. The ad player 160 can present ads that, on the display 218, appear to be within the video frame 310 (internal ads). The ad player 160 can also present ads that, on the display 218, appear to be within the webpage 150 but outside the video frame 310 (external ads). A spatial and temporal portion of the ad player 160 in which an ad is presented is referred to hereinafter as an ad space 320. Ad spaces 320 are further detailed below with respect to FIG. 4.

Figure 3B:
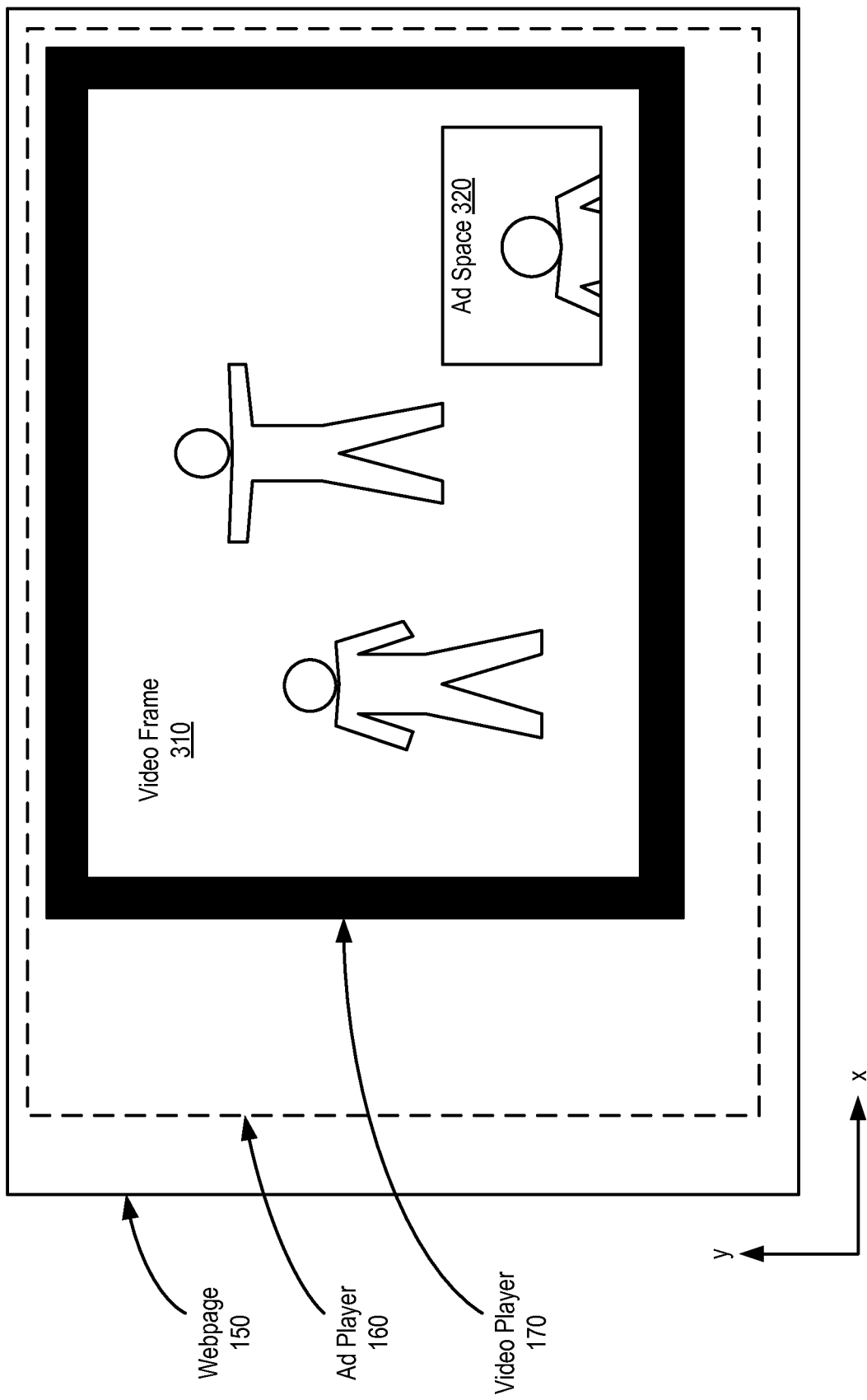
FIG. 3B is a planar view of a configuration for displaying advertisements for online video according to one embodiment.

FIG. 3B illustrates the webpage 150 as seen by a user viewing the display 218 according to one embodiment. Again, for the sake of illustrative clarity, FIG. 3B includes an indication of the x-direction and the y-direction as part of the orthogonal coordinate system presented in FIG. 3A. The z-direction is not illustrated in FIG. 3B because, from the user's perspective, all elements of FIG. 3B appear in the surface plane of the display 218. Aside from the ad space 320, which is seen presenting an internal ad in the lower-right corner of the video frame 310, the ad player 160 is not visible to the user at the moment depicted by FIG. 3B.

The ad player 160 operates as directed by contents of the ad script 180, which the ad player 160 or the web browser 140 transforms into operational instructions. In one embodiment, the ad player 160 executes the ad script 180, receiving the ad script 180 from either the webpage 150 (e.g., the ad script 180 is embedded in source code of the webpage 150), from the publisher server 110, from the ad server 120, or from another server.

Ad Script Characteristics

Figure 4:
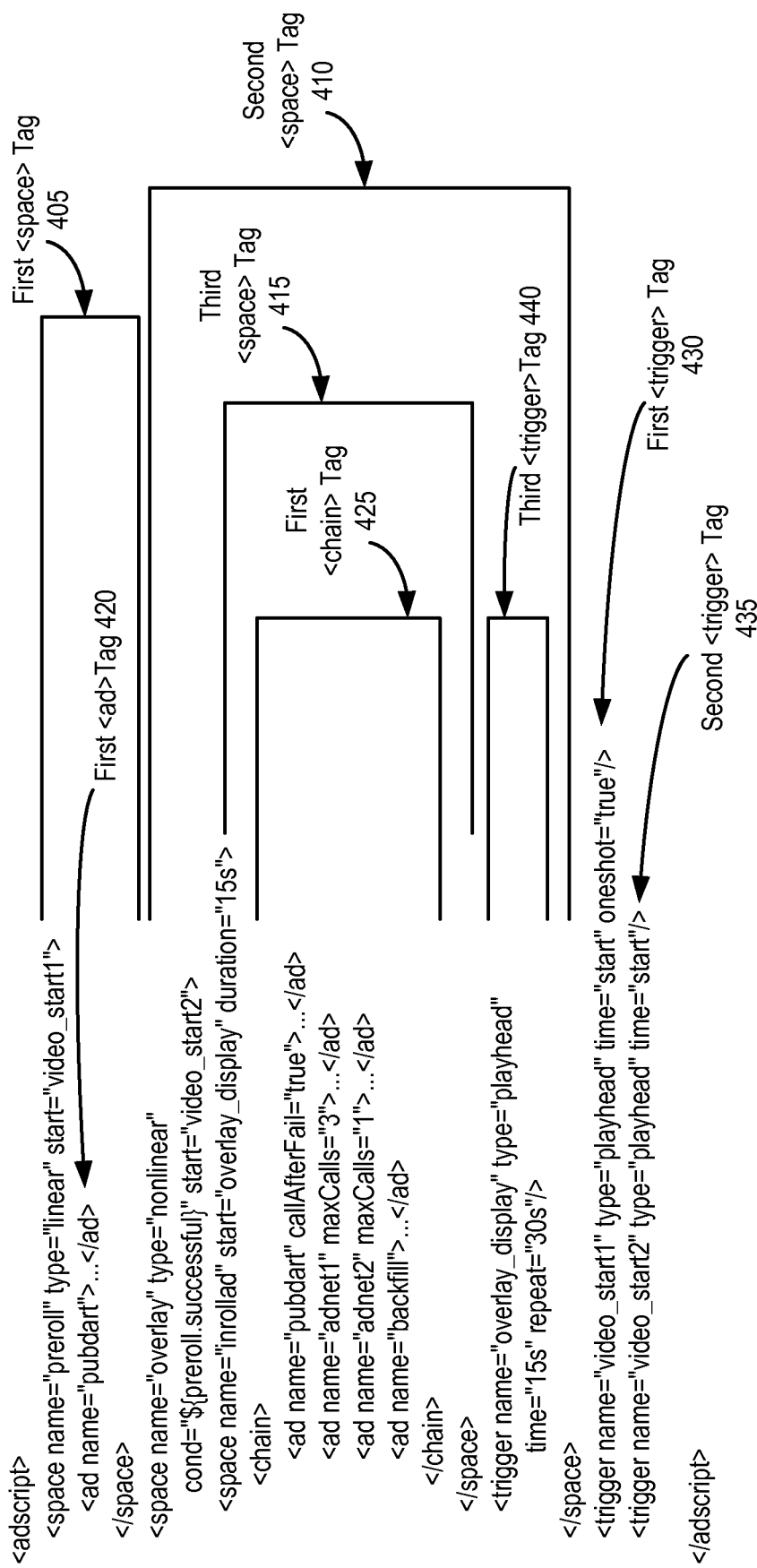
FIG. 4 is an ad script according to one embodiment.

In one embodiment, the ad player 160 dynamically operates as dictated by contents of the ad script 180. FIG. 4 illustrates an example of an ad script 180 in accordance with one embodiment. Beneficially, a publisher of the webpage 150 can arbitrarily and flexibly specify the type, timing, on-screen location, and other behaviors of the ad player 160 and therefore the ads presented in the webpage 150 merely by modifying the ad script 180.

The contents of the ad script 180 not only comprise commands for the ad player 160 to create one or more ad spaces 320, but also comprise data which governs the behavior of created ad spaces 320. An ad space 320 comprises a set of temporal and spatial boundaries which define a location and duration for the presentation of an ad within the ad player 160. The temporal boundaries can comprise points in the playback of a video by the video player 170 (e.g., from 30 seconds into the video until 40 seconds into the video). The spatial boundaries can comprise on-screen locations and can be expressed as distances relative to features of the ad player 160 and/or video player 170 (e.g., a first distance in the x-direction from the left edge of the video frame 310 or a second distance in the y-direction from the bottom edge of the video frame 310.) Thus, an ad space 320 specifies when and where an ad will be presented by the ad player 160.

In one embodiment, the ad script 180 comprises a script in a tag-based markup language that is readable by the ad player 160. The ad script 180 can include one or more <space> tags, <ad> tags, <chain> tags, <trigger> tags, <macro> tags, or <assign> tags. Each tag includes one or more attributes. An attribute is set equal to a value, the value specifying an ad characteristic or behavior associated with the attribute. The ad player 160 receives commands from the ad script 180 by reading the data (i.e., the tags) included therein and, based on the values of their attributes, transforming the ad script 180 data into operational instructions.

Space Tags

In one embodiment, the ad player 160 receives commands for creating an ad space 320 by evaluating a <space> tag included in the ad script 180. The <space> tag includes several attributes whose values specify characteristics and behavior of an associated ad space 320. Thus, the ad player 160 transforms data associated with the <space> tag into specific times, locations, and behaviors for ads displayed in the created ad space 320 associated with the <space> tag. For example, the <space> tag can include an xpos attribute, a ypos attribute, a width attribute, a height attribute, a name attribute, a start attribute, an end attribute, a duration attribute, a type attribute, a condition attribute, and/or a successful attribute. FIG. 4 illustrates a first <space> tag 405, a second <space> tag 410, and a third <space> tag 415, each including attributes set to various values. Furthermore, as detailed below, a <space> tag can be embedded within another enclosing <space> tag as a subspace. For example, the third <space> tag 415 is embedded within the second <space> tag 410. Hence, the second <space> tag 410 is referred to herein as an enclosing space for the third <space> tag 410. A <space> tag can also include other types of tags such as <ad> tags, <chain> tags, and <trigger> tags, as detailed below.

The name attribute of the <space> tag has a value that serves as a name for the associated ad space 320. Portions of the ad script 180 can reference the <space> tag using the value of its name attribute. As shown, the first <space> tag 405 is named preroll, the second <space> tag 410 is named overlay, and the third <space> tag 415 is named inrollad.

The ad script 180 specifies to the ad player 160 a type for the associated ad space 320 using the type attribute of the <space> tag. Possible values of the type attribute include linear, nonlinear, and external. A linear ad space 320 interrupts the playback of any video being played by the video player 170 or any other ad being played by the ad player 160 to present an associated ad. Hence, a linear ad space 320 is analogous to a conventional television advertisement which interrupts a program at a certain predetermined time such that only the conventional television advertisement is presented. The first <space> tag 405 has a type attribute of linear. A nonlinear ad space 320 presents an associated ad in parallel with other items, videos or ads, played by the video player 170 or ad player 160. For example, a nonlinear ad space 320 may present an ad in a corner of a video without interrupting video playback. The second <space> tag 410 has a type attribute of nonlinear. An external ad space 320 appears in an on-screen position outside the boundaries of the video player 170 and is intrinsically nonlinear in nature. When an ad space 320 is enclosed in another ad space 320, it inherits the type of the enclosing space. Hence, the ad space 320 associated with the third <space> tag is nonlinear because the enclosing second <space> tag 410 is nonlinear.

The ad script 180 contents can communicate spatial boundaries for the associated ad space 320 to the ad player 160 using xpos, ypos, width, and/or height attributes. The xpos attribute of the <space> tag allows the ad player 160 to determine an on-screen position of the associated ad space 320 in the horizontal or x-direction. In one embodiment, the value of the xpos attribute corresponds to a distance between the left edge of the associated ad space 320 and the left edge of the video frame 310. In other embodiments, the xpos attribute can correspond to a horizontal distance between another suitable feature of the associated ad space 320 and any suitable feature of the video player 170 and/or ad player 160. If no value is specified for an xpos attribute, the ad player 160 assumes an xpos value of zero when creating the associated ad space 320. Values for a spatial attribute such as xpos can express distances in terms of pixels, inches, millimeters, or any other standard distance unit. In a relative positioning scheme, a positive value for an xpos attribute corresponds to a rightward offset whereas a negative value corresponds to a leftward offset.

The ypos attribute of the <space> tag allows the ad player 160 to determine an on-screen position of the associated ad space 320 in the vertical or y-direction. In one embodiment, the value of the ypos attribute corresponds to a distance between the top edge of the associated ad space 320 and the top edge of the video frame 310. In other embodiments, the ypos attribute can correspond to a vertical distance between another suitable feature of the associated ad space 320 and any suitable feature of the video player 170 and/or ad player 160. If no value is specified for a ypos attribute, the ad player 160 assumes a ypos value of zero when creating the associated ad space 320. Values for ypos can express distances in terms of pixels, inches, millimeters, or any other standard distance unit. In a relative positioning scheme, a positive value for a ypos attribute corresponds to an upward offset whereas a negative value corresponds to a downward offset.

The value of the width attribute of the <space> tag specifies a width of the ad space 320. In one embodiment, if the width attribute is not included or given a value in a <space> tag, the ad player 160 creates the associated ad space 320 with a width equal to the video frame 310 width minus the value of xpos attribute of the <space> tag. If the width attribute is not included or given a value for a <space> tag that is enclosed in an enclosing <space> tag, the ad player 160 creates the associated ad space 320 with a width equal to the enclosing space's width minus the value of xpos attribute of the enclosed <space> tag.

The value of the height attribute of the <space> tag specifies a height of the ad space 320. In one embodiment, if the height attribute is not included or given a value in a <space> tag, the ad player 160 creates the associated ad space 320 with a height equal to the video frame 310 height minus the value of ypos attribute of the <space> tag. If the height attribute is not included or given a value for a <space> tag that is enclosed in an enclosing <space> tag, the ad player 160 creates the associated ad space 320 with a height equal to the enclosing space's height minus the value of ypos attribute of the enclosed <space> tag. Values for height and width attributes can express distances in terms of pixels, inches, millimeters, or any other standard distance unit.

The ad script 180 contents can communicate temporal boundaries for the associated ad space 320 to the ad player 160 using start, end, and/or duration attributes. The start attribute of the <space> tag specifies when the ad player 160 creates and begins implementing the associated ad space 320 by referencing an associated <trigger> tag. The details of <trigger> tags are provided below. In one embodiment, a value of the start attribute corresponds to a name of a <trigger> tag that defines an event such as a certain point in the playback of a video presented by the video player 170. If the start attribute is not included or given a value in a <space> tag, the ad player 160 begins executing the associated ad space 320 immediately after executing any linear-type ad spaces 320 that appear earlier within the ad script 180. In absence of any preceding linear-type ad spaces 320, the ad player 160 begins executing the associated ad space 320 as soon as the video player 170 or an enclosing space begins execution.

As mentioned above, the value of the start attribute of a <space> tag can reference an event defined by an associated <trigger> tag included in the ad script 180. For example, the first <space> tag 405 has a start attribute set to a value of video_start1, which is also the name of the first <trigger> tag 430 as specified by the name attribute of the first <trigger> tag 430. Hence, the values of the attributes of the first <trigger> tag 430 define an event whose occurrence will trigger the ad player 160 to initiate the ad space 320 associated with the first <space> tag 405. Additional structural and operational details of <trigger> tags are provided below.

The ad script 180 can specify an end time or a duration of the space using the end attribute and/or the duration attribute. The value of the end attribute specifies a time (e.g., a video playback point) at which the ad player 160 ceases the associated ad space 320. In one embodiment, a value of the end attribute corresponds to an event such as a certain point in the playback of a video presented by the video player 170. As described above in reference to the start attribute, an event specified as the value of the end attribute of a <space> tag can be defined using an associated <trigger> tag included in the ad script 180. The value of the duration attribute of the <space> tag specifies a duration for the ad space 320 after the value of the start attribute. The duration value is expressed in standard units of time but corresponds to a duration of video playback. Hence, for example, time during which the video is paused does not count towards the specified duration. If both end and duration attributes are specified in a single <space> tag, the ad player 160 ceases execution of the associated as space 320 according to whichever attribute's value occurs first. The ad player 160 can also end an ad space 320 when the associated ad or an enclosing space ends.

As previously described, the publisher of the webpage 150 can easily modify the behavior of the ad player 160 simply by setting values for attributes of the ad script 180. However, the ad script 180 can also include attributes that are set dynamically by the ad player 160. Attributes set by the ad player 160 are referred to hereinafter as generated attributes and can provide contextual information. As used herein, contextual information refers to information that describes a context in which the ad player 160 presents an ad. Contextual information can describe ad player 160 and/or video player 170 operation or information related to characteristics of the user or client 130. For example, contextual information can include demographic information (e.g., age, gender, etc.) for the user, a geographic location of the client 130, a time of day, an IP address, a number of times that the web browser 130 has loaded the webpage 150, or a number of times that the ad script 180 has been executed by the ad player 160 on the client 130. The ad player 160 can modify the ad script 180 to reflect contextual information. For example, a <space> tag can include a successful attribute whose value is set to true by the ad player 160 when it presents an ad in the associated ad space 320 and is set to false by the ad player 160 when it fails to present an ad in the associated ad space 320.

In one embodiment, the contents of the ad script 180 can be transformed by the ad player 160 into operational commands which modify behavior of the associated an ad space 320 based upon contextual and run-time information. For example, a <space> tag can include a conditional or cond attribute whose value comprises a Boolean expression. If the Boolean expression evaluates to true, the ad player 160 implements the associated ad space 320. However, if the Boolean expression evaluates to false, the ad player 160 does not implement the associated ad space 320. For example, the second <space> tag 410 has a conditional (i.e., cond) attribute whose value is "${preroll.successful}." Hence, the ad player 160 executes ad space 320 associated with the second <space> tag 410 only if the ad player 160 has previously presented an ad in the ad space 320 associated with the first <space> tag 405 (named "preroll"), resulting in the generated successful attribute being set to true by the ad player 160. Hence, generated and conditional attributes included in an ad script 180 allow the publisher of the webpage 150 to make ad player 160 operations dependent upon contextual information available at run-time of the ad player 160 and/or video player 170.

Ad Tags

In one embodiment, the ad player 160 receives commands for retrieving and rendering ads for presentation in a created ad space 320 by evaluating an <ad> tag included in the ad script 180. The <ad> tag includes several attributes whose values specify characteristics and behavior of an associated ad space 320. In one embodiment, each <space> tag includes one or more <ad> tags whose attribute values which specify an ad for presentation within the associated ad space 320. An <ad> tag can include a name attribute, a conditional attribute, a callAfterFail attribute, a maxCalls attribute, as well as various generated attributes.

In one embodiment, the name attribute of an <ad> tag has a value which identifies a specific ad for display in the associated ad space 320. In response to determining the value of the name attribute of the <ad> tag, the ad player 160 retrieves the identified ad over the network 190 from the ad server 120. For example, the first <ad> tag 420 shown in FIG. 4 identifies an ad named "pubdart." As described above in reference to FIG. 1, the retrieved ad can be any type of conventional static or video-based ad suitable for display with online video. For example, the retrieved ad can be a linear ad (i.e., an ad that interrupts the presentation of an online video) or a non-linear ad (i.e., an ad that is presented concurrently with the online video) presented either before, during, or after the online video. The retrieved ad can also be a text ad, a graphic ad (sometimes referred to as a banner ad), or a video ad. The retrieved ad can be presented as overlaying the online video or in any other position within the webpage 150. The retrieved ad can also be interactive and, in one embodiment, the retrieved ad can transition from one of the aforementioned varieties of ads to a different variety or trigger an additional retrieved ad in response to an action by the user.

In other embodiments, the name attribute of an <ad> tag simply provides an identifier by which other tags in the ad script 180 can reference the <ad> tag. In such embodiments, the ad script 180 identifies an ad for retrieval by including other ad-specific information that is unique to the identified ad, the ad server 120 associated with the identified ad, the ad network or advertiser associated with the identified ad, and/or other ad-specific information. Such ad-specific information can vary greatly and therefore is not shown in the sample ad script 180 of FIG. 4, but can be included, for example, in the portion of an <ad> tag such as that occupied by the ellipsis ( . . . ) in the first <ad> tag 420. In such embodiments, the ad player 160 retrieves the ad identified by the ad script 180 by ad-specific information over the network 190 from the ad server 120 as described above. It is also possible for an <ad> tag to include actual contents of an ad (e.g., the text for a text ad), thereby enabling the ad player 160 to presented the ad without interacting with an ad server 120.

In one embodiment, the ad player 160 also retrieves from the ad server 120 an ad module for the identified ad. The ad module comprises processing logic that enables the ad player 160 to render the ad on-screen. Hence, the publisher can configure the webpage 150 to include any type of ad supported by the ad server 120 without the inconvenience of modifying the webpage 150, the ad player 160, or the video player 170. Rather, the publisher need merely modify the ad script 180 because ad player 160 is able to reconfigure itself dynamically and flexibly as instructed by the ad script 180 to present ads of any supported type as desired.

Similar to a <space> tag, an <ad> tag can also include a conditional or cond attribute whose value comprises a Boolean expression. If the Boolean expression evaluates to true, the ad player 160 retrieves and presents the corresponding ad in the associated ad space 320. However, if the Boolean expression evaluates to false, the associated ad is not retrieved or presented. Hence, conditional presentation of ads can be specified by setting values of attributes of either a <space> tag or an enclosed <ad> tag within the ad script 180.

The callAfterFail attribute of an <ad> tag can have a value of either true or false. If the value is true, the ad player 160 attempts to retrieve and present the identified ad even if previous attempts have resulted in a failure. However, if the value is false, the ad player 160 does not attempt to retrieve and present the identified ad if a previous attempt has failed. The maxCalls attribute is set to an integer value that specifies a maximum number of times that the ad player 160 will present the identified ad. This is useful when an <ad> tag is enclosed within a <chain> tag, as detailed below.

An <ad> tag can also include generated attributes whose values are set by the ad player 160 during execution of the ad script 180. For example, the ad player 160 can set a successful attribute of an <ad> tag to a value of true if the previous attempt by the ad player 160 to present the identified ad was successful. Other generated attributes include a numsucc attribute and a numfail attribute, whose respective values are set by the ad player 160 to indicate the number of successful and failed attempts to present the identified ad.

Chain Tags

As mentioned above, <ad> tags can be enclosed within a <chain> tag. A <chain> tag comprises a list of <ad> tags and, when transformed into operational instructions by the ad player 160, specifies an ordered sequence of ads for presentation by the ad player 160. The values of the callAfterFail and maxCalls attributes of the enclosed <ad> tags specify the behavior of the identified ads in the case of failures by any of the ads included in the <chain> tag. By modifying attributes of the <ad> tags enclosed with the <chain> tag (e.g., conditional, callAfterFail, or maxCalls attributes), the publisher of the webpage 150 can prioritize the ads associated with the <chain> tag. For example, FIG. 4 illustrates a first <chain> tag 425 that encloses four <ad> tags having callAfterFail and maxCalls attributes of various values. A <chain> tag can include name and conditional attributes similar to those described above in reference to <space> and <ad> tags.

A <chain> tag can also include one or more generated attributes. For example, the <chain> tag can include a successful attribute whose value is set to true by the ad player 160 if at least one of the enclosed <ad> tags results in a successful presentation of an ad. The <chain> tag can also include a successes attribute whose value is set by the ad player 160 to an integer that indicates how many of the enclosed <ad> tags resulted in a successful ad presentation. Similarly, the failures attribute has a value set by the ad player 160 to an integer that indicates how many of the enclosed <ad> tags resulted in a failed attempt to present an identified ad. Other generated attributes include a lastsucc attribute and the lastfail attribute, whose respective values are set by the ad player 160 to indicate the name of the <ad> tags within the <chain> tag associated with the most recently successful and failed ad presentation attempts.

Trigger Tags

The data included in the ad script 180 controls timing of ad player 160 operation. In one embodiment, the ad player 160 receives timing commands from the ad script 180 by evaluating <trigger> tags included in the ad script 180. FIG. 4 illustrates a first <trigger> tag 430, a second <trigger> tag 435, and a third <trigger> tag 440 as examples. A <trigger> tag includes attributes whose values define a triggering event used as a timing reference by the ad player 160 during the presentation of ads. Examples of possible triggering events are described below. A <trigger> tag can be enclosed within a <space> tag, referred to herein as a local trigger, or can be included in the ad script 180 outside of any <space> tag, referred to herein as a global trigger. In one embodiment, a local trigger is only active while the ad player 160 is executing the enclosing <space> tag.

A <trigger> tag includes a name attribute and a type attribute whose respective values provides a name and specify a type for the defined triggering event. Examples of possible values for the type attribute and associated triggering events are described below. The triggering event can be referenced, for example, as a value for a start attribute or an end attribute of a <space> tag, elsewhere in the ad script 180. Similarly, a <trigger> tag can include a start attribute or an end attribute whose value references the name of a separate <trigger> tag, allowing a first triggering event to be predicated upon a second triggering event. A <trigger> tag can also include a conditional attribute similar to those described above in reference to <space> and <ad> tags. A <trigger> tag can also include one or more generated attributes such as a fired attribute whose value is set to true by the ad player 160 if the defined triggering event has occurred. Another possible generated attribute is an enabled attribute whose value is set to true based on, for example, a conditional attribute.

A first possible value for a type attribute of a <trigger> tag is playhead. A playhead type event corresponds to a particular point in the playback of a video by the video player 170. A <trigger> tag having a type attribute set to playhead can also have a time attribute, a repeat attribute, a maxreps attribute, a forced attribute, and a oneshot attribute. The value of the time attribute indicates the triggering event as a delay in playback time from the start of the video (e.g., 30 seconds after start of the video by the video player 170). In addition to numeric values with optional units of milliseconds, seconds, or minutes, the time attribute can also specify a time in terms of a count of video frames. The time attribute can also have a value of start or end indicating either the start or the end of the video as the triggering event. If included in the <trigger> tag, the repeat attribute specifies that the triggering event should fire repeatedly. The value of the repeat attribute is a time value that is transformed by the ad player 160 into an interval between firings. If included, the value of the maxreps attribute specifies a number of times for the triggering event to fire at the interval specified by the value of the repeat attribute. If the forced attribute is set to true, the triggering event fires if the user fast-forwards past the point in the video specified by the value of the time attribute. If the oneshot attribute has a value of true, the triggering event will not occur twice if the user rewinds the video past the point in the video specified by the value of the time attribute. Setting the oneshot attribute to true specifies that the triggering event occurs only once during the video, ensuring that the triggering event will not occur twice if the user rewinds the video past the point in the video specified by the value of the time attribute.

A second possible value for a type attribute of a <trigger> tag is wallclock. A wallclock event is analogous to a playhead type event, but once a video begins playing, user actions such as pausing, rewinding, or fast forwarding do not affect wallclock events. For example, if a wallclock event is set to fire 30 seconds after the video begins playing, the wallclock event will fire 30 seconds after the user selects play regardless of other user actions. A <trigger> tag having a type attribute set to wallclock has the same attributes as a playhead type <trigger> tag.

A third possible value for a type attribute of a <trigger> tag is space. A space event defines a triggering event that is predicated upon an action associated with a particular ad space 320. A space type <trigger> reference the particular ad space 320 using the name of the associated <space> tag. A space type event can include an action attribute with a value of either start or end. If the value of a space type event action attribute is start, the triggering event is the start of the associated ad space 320. Analogously, if the value of a space type event action attribute is end, the triggering event is the end of the associated ad space 320. Other ad space 320 events include any type of user interaction with an ad presented therein such as a click, a double click, selection of a close or exit icon include in the ad, a mouse entering or leaving on-screen real estate occupied by the ad, a mouse hovering over the ad. A fourth possible value for a type attribute of a <trigger> tag is Boolean. A Boolean type <trigger> tag includes a Boolean expression comprising multiple triggering events.

Referring now to FIG. 4, the first <trigger> tag 430 has a name attribute of video_start1, which corresponds to the start attribute of the first <space> tag 405. The first <trigger> tag 430 has a type attribute of playhead, a time attribute of start, and a oneshot attribute set to true. Hence, the ad player 160 will begin executing the first <space> tag 405 and therefore the first <ad> tag 420 enclosed therein at the start of the video within the video player 170 and will only execute the first <space> tag once during the video.

The second <trigger> tag 435 has a name attribute of video_start2, which corresponds to the start attribute of the second <space> tag 410. Like the first <trigger> tag 430, the second <trigger> tag 435 also has a type attribute of playhead and a time attribute of start. However, the second <space> tag 410 has a conditional (i.e., cond) attribute that only evaluates true if the space named preroll (i.e., the first <space> tag) is successful. Hence, the ad player 160 will begin executing the second <space> tag 410 after the ad player 160 has successfully finished executing the first <space> tag 405.

The third <trigger> tag 440 has a name attribute of overlay_display, which corresponds to the start attribute of the third <space> tag 415. The third <trigger> tag 440 has a type attribute of playhead, a time attribute of 15 seconds, and a repeat attribute of 30 seconds. Hence, the ad player 160 will begin executing the third <space> tag 415 and therefore the first <chain> tag enclosed therein fifteen seconds after the start of the enclosing space, the space associated with the second <space> tag 410, and will repeat execution of the third <space> tag every thirty seconds thereafter during the video.

Macros

In one embodiment, the ad script 180 and ad player 160 support a macro language. The macro language can include any number of conventional logical expressions such as Boolean expressions or strings. A macro can be utilized as the value for any attribute of any tag included in the ad script 180. In one embodiment, the ad player 160 evaluates each attribute value in the ad script 180 as a macro. In such an embodiment, the ad player 160 merely evaluates static attribute values such as those as described above and illustrated in FIG. 4 as degenerate macros, thereby correctly interpreting the static attribute values. An attribute whose value is set using a macro can command complex behaviors to the ad player 160 as such a value will change based on dynamic contextual information that changes during operation of the video player 170 and/or ad player 160.

Condition attributes, such as those for the above-described tags, are highly suitable for macro-based values. When a macro-determined value of a condition attribute evaluates as false, the ad player 160 does not evaluate the associated tag or any tags enclosed therein. Thus, by including macros in the values of tag attributes, the publisher of the webpage 150 can enable/disable ad spaces 320 or specific aspects of their operation based on contextual information related to the presentation of the video by the video player 170 and or ads by the ad player 160 (e.g., turn off any overly ads for a video if a preroll ad has already been presented for the video).

In one embodiment, a macro can be implemented using a <macro> tag. The <macro> tag can have a name attribute whose value comprises a string by which other elements of the ad script 180 can refer to the <macro> tag. The <macro> tag can contain a single macro expression that is evaluated by the ad player 160. The <macro> tag can also include a conditional attribute similar to those described above for other tags. The conditional attribute of the <macro> tag can itself be set to a value using a second macro expression, thereby enabling the nesting of macro expressions. If the ad player 160 evaluates a macro expression as false, the ad player 160 interprets any enclosing <macro> tags as empty strings. In one embodiment, <macro> tags are primarily for evaluating macros that appear within ordinary strings with the ad script 180 and are primarily used to embed contextual information.

Assign Tags

The ad script 180 can also include an <assign> tag which serves to specify a value for a expression used by a macro. In one embodiment, specifying the <assign> tag is analogous to setting a variable. The <assign> tag has a key attribute whose value is identical to the macro expression. The <assign> tag also has a value attribute. In one embodiment, upon evaluation of the <assign> tag, the ad player 160 substitutes the value of the <assign> tag value attribute for any identical macro expression encountered in a <macro> tag. For example, if the <assign> tag has a key attribute equal to "x" and a value attribute of "3", the ad player 160 will substitute "3" for "x" in the <macro> tags included in the ad script 180.

Ad Player Operation

Figure 5:
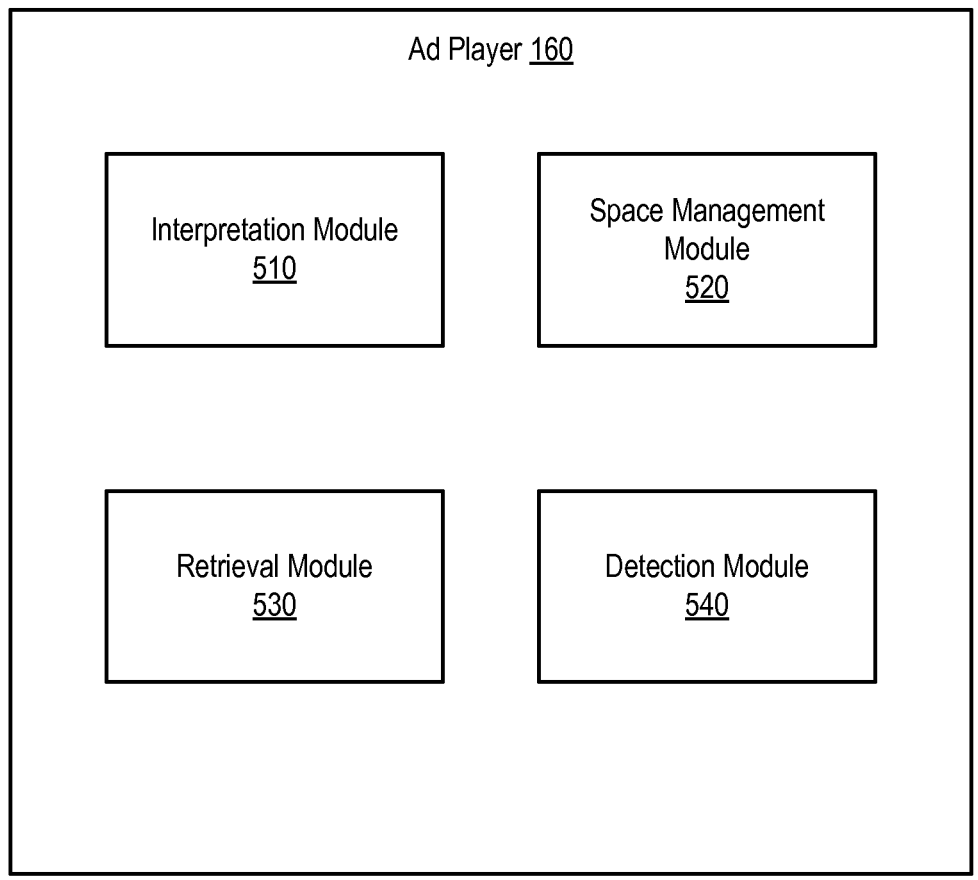
FIG. 5 is a high-level bock diagram of an ad player according to one embodiment.

FIG. 5 shows a block diagram illustrating architectural elements of the ad player 160 according to one embodiment. The ad player 160 comprises an interpretation module 510, space management module 520, retrieval module 530, and trigger detection module 540. Internal to the ad player 360, the interpretation module 510, space creation module 520, retrieval module, and detection module are communicatively coupled to one another.

The interpretation module 510 retrieves the ad script 180 from the webpage 150. The interpretation module then interprets and evaluates any tags included in the ad script 180 as described above. Based on its evaluation of the ad script 180, the interpretation module 510 issues commands to the other modules of the ad player. As described above, the ability of the ad player 160 to interpret the contents of the ad script 180 and dynamically and flexibly adapt its operation accordingly has many benefits. For example, the publisher of the webpage 150 does not need to redesign the webpage 150 or consult with the owner of the ad server 120 to alter the advertising content or behavior of the webpage. Rather, which ads are displayed as well as where, when, and how they are displayed by the ad player 160 can be modified in a dynamic and flexible manner simply by altering the ad script 180. Hence, the publisher of the webpage 150 can modify operation of the ad player 160 via the publisher server 110 and need not access the ad server 120. Furthermore, local execution of the ad script 180 by the client 130 offloads a significant processing burden from the ad server 120, beneficially reducing design and performance requirements for the ad server 120. Additionally, local execution of the ad script 180 by the client 130 also improves performance of the ad player 160 from the user's perspective as communications over the network 190 and associated delays are reduced.

The space management module 520 creates and manages ad spaces based on commands received from the interpretation module. The space management module also sends messages to the interpretation module regarding ad space 320 operations to provide contextual information, enabling the interpretation module 510 to properly evaluate any expressions (e.g., macro expressions) in the ad script 180 dependent upon such information. For example, the space management module 520 can communicate to the interpretation module 510 that an ad space 320 has been created, an event which may comprise a triggering event defined by a <trigger> tag in the ad script 180 having a type attribute with a value of space.

The retrieval module 530 comprises a communication interface suitable for communicating with the ad server 120 over the network 190. The retrieval module 530 retrieves ads and associated rendering modules as commanded by the interpretation module. The ads and rendering modules retrieved by the retrieval module 530 are transmitted to the space management module 520 for presentation in the appropriate ad spaces 320.

The detection module 540 detects events (e.g., playback events) related to the operation of the ad player 160 and/or the video player 170 and communicates the events to the interpretation module 510. In one embodiment, the interpretation module 510 evaluates the ad script 180, determines any events relevant to execution of tags included therein (e.g., triggering events defined by <trigger> tags in the ad script 180), and commands the detection module 540 to monitor the ad player 160 and/or video player 170 for the occurrence of such events and alert the interpretation module 510 of their occurrence.

ADDITIONAL CONSIDERATIONS

Some portions of above description describe the embodiments in terms of algorithms and symbolic representations of operations on information. For example, the description corresponding to FIGS. 3A, 3B, 4, and 5 relate to an ad player 160 that transforms to data included in an ad script 180 to generate operational parameters and instructions. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Software and firmware configurations of the modules and corresponding instructions described above can be stored in, for example, the storage device 208 and/or the memory 206 and can be executed by, for example, the processor 202, adapters 212, 216, controllers 220, 222, and/or multiple such devices operating in parallel.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying an advertisement in an ad player in a flexible and reconfigurable manner, the ad player configured as an overlay of a webpage that includes an online video player, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for displaying one or more content in an ad player executing on a device, the ad player associated with a video player, the method comprising:

retrieving, over a network by a web browser, a web page including a video player and an ad player associated with the video player;

executing, by the web browser, the ad player;

retrieving, by the ad player, a script comprising content data and one or more tag elements, the one or more tag elements comprising one or more attributes corresponding to one or more values;

evaluating, by the ad player, the script to determine a specific content for display, a trigger tag, and a space tag, the space tag comprising a first local trigger tag, a spatial attribute, and a temporal attribute;

determining, by the ad player, a value of the spatial attribute and a value of the temporal attribute, wherein the value of the spatial attribute defines a location boundary and the temporal attribute defines a time boundary;

creating, by the ad player, a defined area of the web page for presenting the specific content based on the determined spatial boundary and temporal boundary;

determining a first triggering event of the trigger tag wherein the triggering event initiates retrieval, rendering, and displaying of the specific content, the displaying within the defined area of the web page; and determining a second triggering event which ends the display of the specific content.

2. The method of claim 1, further comprising:
retrieving processing logic from a content server for rendering the specific content.

3. The method of claim 1, wherein the first triggering event defines a first event occurring within the video player to initiate presenting of the specific content; and
wherein the second triggering event defines a second event occurring within at least one of the web page and the video player to end presenting of the specific content.

4. The method of claim 3, further comprising:
evaluating a first trigger tag element included in the script that defines the first triggering event; and
monitoring operations of the at least one of the web page and the video player to detect the defined first triggering event.

5. The method of claim 4, further comprising:
responsive to detecting the defined first triggering event, setting an attribute of the first trigger tag element to reflect occurrence of the defined first triggering event.

6. The method of claim 3, further comprising:
evaluating a second trigger tag element included in the script that defines the second triggering event; and
monitoring operations of the at least one of the web page and the video player to detect the defined second triggering event.

7. The method of claim 1, further comprising:
responsive to presenting for display the specific content within the defined area of the web page, modifying the script to reflect successful presentation of the specific content.

8. A system for displaying one or more content in an ad player, wherein the ad player executes on a device, the ad player associated with a video player, the system comprising:
a storage device storing instructions; and
processor configured to execute the instructions to perform a process, the process comprising:
retrieving, over a network by a web browser, a web page including a video player and an ad player associated with the video player;
executing, by the web browser, the ad player;
retrieving, by the ad player, a script comprising content data and one or more tag elements, the one or more tag elements comprising one or more attributes corresponding to one or more values;

evaluating, by the ad player, the script to determine a specific content for display, a trigger tag, and a space tag, the space tag comprising a first local trigger tag, a spatial attribute, and a temporal attribute;

determining, by the ad player, a value of the spatial attribute and a value of the temporal attribute, wherein the value of the spatial attribute defines a location boundary and the temporal attribute defines a time boundary;

creating, by the ad player, a defined area of the web page for presenting the specific content based on the determined spatial boundary and temporal boundary;

determining a first triggering event of the trigger tag wherein the triggering event initiates retrieval, rendering, and displaying of the specific content, the displaying within the defined area of the web page; and determining a second triggering event which ends the display of the specific content.

9. The system of claim 8, wherein evaluating the script comprises:
determining an output of a macro expression included in the script, the macro expression comprising a logical expression based on contextual information for the ad player or the video player.

10. The system of claim 8, wherein retrieving the script comprises retrieving the script from content of the web page, or retrieving the script from a server, the script corresponding to the web page.

11. The system of claim 8, the process further comprising:
retrieving processing logic from a content server for rendering the specific content.

12. The system of claim 8, wherein the process of determining the spatial boundary for the defined area of the web page from the script comprises:
evaluating a tag element included in the script, the tag element associated with the defined area of the web page; and
determining a value of a spatial attribute included in the tag element, the value corresponding to the spatial boundary.

13. The system of claim 8, wherein the process of determining the temporal boundary for the defined area of the web page from the script comprises:
evaluating a tag element included in the script, the tag element associated with the defined area of the web page; and
determining a value of a temporal attribute included in the tag element, the value corresponding to the temporal boundary.

14. The system of claim 8, wherein the first triggering event defines a first event occurring within the video player to initiate presenting of the specific content; and
wherein the second triggering event defines a second event occurring within at least one of the web page and the video player to end presenting of the specific content.

15. A non-transitory machine-readable medium storing instructions that, when executed by a computer system, causes the computing system to perform a method for displaying one or more content in an ad player executing on a device, the ad player associated with a video player, the method including:

retrieving, over a network by a web browser, a web page including a video player and an ad player associated with the video player;

executing, by the web browser, the ad player;

retrieving, by the ad player, a script comprising content data and one or more tag elements, the one or more tag elements comprising one or more attributes corresponding to one or more values;

evaluating, by the ad player, the script to determine a specific content for display, a trigger tag, and a space tag, the space tag comprising a first local trigger tag, a spatial attribute, and a temporal attribute;

determining, by the ad player, a value of the spatial attribute and a value of the temporal attribute, wherein the value of the spatial attribute defines a location boundary and the temporal attribute defines a time boundary;

creating, by the ad player, a defined area of the web page for presenting the specific content based on the determined spatial boundary and temporal boundary;

determining a first triggering event of the trigger tag wherein the triggering event initiates retrieval, rendering, and displaying of the specific content, the displaying within the defined area of the web page; and determining a second triggering event which ends the display of the specific content.

16. The non-transitory machine-readable medium of claim 15, wherein the first triggering event defines a first event occurring within the video player to initiate presenting of the specific content; and wherein the second triggering event defines a second event occurring within at least one of the web page and the video player to end presenting of the specific content.

17. The non-transitory machine-readable medium of claim 16, the method further comprising:

evaluating a first trigger tag element included in the script that defines the first triggering event; and monitoring operations of the at least one of the web page and the video player to detect the defined first triggering event.

18. The non-transitory machine-readable medium of claim 15, the method further comprising:

responsive to detecting the defined first triggering event, setting an attribute of the first trigger tag element to reflect occurrence of the defined first triggering event.

19. The non-transitory machine-readable medium of claim 15, the method further comprising:

responsive to presenting for display the specific content within the defined area of the web page, modifying the script to reflect successful presentation of the specific content.

20. The non-transitory machine-readable medium of claim 15, wherein evaluating the script comprises:

determining an output of a macro expression included in the script, the macro expression comprising a logical expression based on contextual information for the ad player or the video player.

\* \* \* \* \*